United States Patent
Yi

(10) Patent No.: US 6,813,715 B2
(45) Date of Patent: Nov. 2, 2004

(54) METHOD FOR ACCESSING HOME-NETWORK USING HOME-GATEWAY AND HOME-PORTAL SERVER AND APPARATUS THEREOF

(75) Inventor: Kyoung Hoon Yi, Seoul (KR)

(73) Assignee: Samsung Electronics Co., Ltd., Kyungki-do (KR)

(*) Notice: Subject to any disclaimer, the term of this patent is extended or adjusted under 35 U.S.C. 154(b) by 793 days.

(21) Appl. No.: 09/794,158

(22) Filed: Feb. 28, 2001

(65) Prior Publication Data

US 2002/0066029 A1 May 30, 2002

(30) Foreign Application Priority Data

Nov. 30, 2000 (KR) .......................... 2000-72126

(51) Int. Cl.[7] .............................................. G06F 17/00
(52) U.S. Cl. ...................... 713/201; 713/150; 713/151; 713/153; 713/154
(58) Field of Search ................................. 713/150–154, 713/200–202, 160–168, 155

(56) References Cited

U.S. PATENT DOCUMENTS 6,738,912 B2 * 5/2004 Buttiker ....................... 713/202
6,754,712 B1 * 6/2004 Valencia ....................... 713/201
6,754,832 B1 * 6/2004 Godwin et al. ............. 713/201

OTHER PUBLICATIONS

Verjinski, Phase, a portable host access system environment, Military Communications Conference, 1989, Conference Record 'Bridging the Gap. Interoperability, Survivability, Security', 1989 IEEE, Oct. 15–18, pp. 806–809 vol. 3.*

Xun Qu et al., A practical method for achieving portable communications in the Internet context, Global Telecommunications Conference, 1995, GLOBECOM '95, IEEE, pp. 1512–1516 vol. 2.*

Shieh et al., Network address translators: effects on security protocols and applications in the TCP/IP stack, Internet Computing IEEE vol. 4, Issue 6, Nov.–Dec. 2000, pp. 42–49.*

* cited by examiner

*Primary Examiner*—David Jung
(74) *Attorney, Agent, or Firm*—Sughrue Mion, PLLC

(57) ABSTRACT

A method for accessing a home-network in which a home network system linked to a home-gateway that is accessed in relation to a home-portal service, and an apparatus thereof are provided. The method for accessing to a home-network, in a network access method of a network system wherein an open Internet Protocol (IP) address is used for an external network and a private IP address is provided for an internal network resource, the method for accessing to the home-network has the steps of (a) collecting user information and an open IP address from the network system; (b) authenticating an authorized user, who wants to access an internal network resource, based on the user information and open IP address collected in the step (a); and (c) providing the open IP address to the user authenticated in the step (b) so that a virtual network between the authenticated user and the internal network resource that the user wants to use is built.

21 Claims, 10 Drawing Sheets

METHOD FOR ACCESSING HOME-NETWORK USING HOME-GATEWAY AND HOME-PORTAL SERVER AND APPARATUS THEREOF

BACKGROUND OF THE INVENTION

1. Field of the Invention

The present invention relates to a method for accessing a home-network using a home-gateway and a home-portal server, and more particularly, to a method for accessing a home-network, in which a home network system linked to a home-gateway is accessed in relation to a home-portal service, and an apparatus thereof. The present application is based on Korean Patent Application No. 2000-72126, which is incorporated herein by reference.

2. Description of the Related Art

Generally, a home-network is established in an environment such as a house or small-sized office, and linked to the Internet. An external user controls various apparatuses linked to the home-network through the Internet.

Referring to FIG. 1, home-network apparatuses 140 and 150 linked to a home-network 130 are linked to the Internet 100 through a home-gateway 120. The home-gateway 120 has limited open Internet Protocol (IP) addresses and mediates the home-network apparatuses 140 and 150 having private IP addresses in order to access sites linked to the Internet 100. At this time, only one open IP address is assigned to the home-gateway 120, and private IP addresses which cannot be externally recognized are assigned to the home-network apparatuses 140 and 150 linked to the home-network 130. Therefore, when the home-network apparatuses 140 and 150 linked to the home-network 130 want to receive information from the outside, the home-gateway 120 should convert the private IP addresses of the home-network apparatuses 140 and 150 into its open IP addresses using a network address translation (NAT). The Internet Service Provider (ISP) 110 provides Internet access services to the home-gateway 120.

Referring to FIG. 2, the home-gateway 120 includes an external network interface 212 for forming a communication channel to link the external Internet, a home-network interface 214 for forming a communication channel to link a home-network 130, an open IP layer 211 corresponding to the external network interface and a private IP layer 213 corresponding to the home-network interface 214. The open IP layer 211 uses a dynamic open IP address, while the private IP layer 213 uses a private IP address. An IP address converting unit 210 relays a packet transmission, by converting an open IP address input from the open IP layer 211 to a private IP address or converting a private IP address input from the private IP layer 213 to an open IP address.

Referring to FIG. 3, an ordinary enterprise network uses a virtual private network (VPN) technology with which a computer 310 linked to the Internet 100 accesses to an in-office server 311 linked to an in-office network 300 which is protected from the Internet 100 by a firewall system 312.

The external computer 310 accesses the firewall system 312 through communication channels 301 and 303 linked to the Internet 100, and if an authentication is successfully carried out, a virtual communication channel 304 to the in-office network 300 is formed. This virtual channel is implemented actually using various communication channels 303, 100, 301, and 302, but, by additionally using a software tunneling technology, the virtual channel operates as if it is directly connected to the in-office network 300.

Referring to FIG. 4, the external computer 310 forms a virtual channel by generating a virtual interface 411 to be linked to a virtual network interface 412 inside the firewall system 312 through physical communication channels 303, 100, and 301.

The firewall system 312 has a routing unit 413 which connects a network channel 302 for linking the virtual network interface 412 to the in-office network 300, and forms an internal communication channel 401 through the routing unit 413. A virtual channel, which makes the external computer 310 look directly connected to the in-office network 300, is formed by adding this internal communication channel 401 and the virtual channel 400.

However, in the NAT, which is a conventional Internet sharing technology, the home-network apparatuses 140 and 150 can operate normally, only when an access request from an external apparatus exists. Also, when a user accesses from outside to home-network apparatuses 140 and 150 linked to home-network 130, the following problems exist.

First, the open IP address of the home-gateway 120 does not have a permanently fixed value due to an economical reason. That is, since the area of open IP addresses is limited and the number of user systems to be supported are great, most ISPs 110 manage predetermined IP addresses in the form of a pool and dynamically assign the addresses only when a user system requires an IP address. Therefore, the existing open IP address assigning method has no problem in simply realizing an Internet sharing function in a home-network, but, if a user wants to control the home-network apparatuses 140 and 150 linked to the home-network 130 from the outside, it causes a problem in which the user cannot easily find an open IP address of the home-network to be controlled.

Meanwhile, even when the address of the home-gateway 120 that is an entrance to the home-network 130 is determined, there are many limitations in accessing the home-network apparatuses 140 and 150 inside the home-network 130. That is, since the internal home-network apparatuses 140 and 150 use private IP addresses, when an external network apparatus such as the computer 310 transmits data using the private IP address, a routing in the Internet cannot be made normally. Also, since only the header part of a packet is modified when the NAT technology is used, the application programs, which describe the IP addresses of a source and a destination in the payload part of a packet, do not operate normally. Therefore, a separate program corresponding to each application program should be used in the gateway to process input data. Also, though the VPN technology is to allow access to an internal network with little expense and guaranteed security, the VPN technology is designed to operate only when a client knows in advance the IP address of a VPN server to be accessed in order to keep a high level security, and so far has never been applied to the home-network field.

SUMMARY OF THE INVENTION

To solve the above problems, it is an object of the present invention to provide a method for accessing a home-network in which a user accesses a home-portal server from an arbitrary external system, and then accesses to the home-network, using the collected open IP address of the home-gateway, in order to remotely control various systems linked to the home-network.

It is another object to provide a home-network access system to which the home-network access method is applied.

To accomplish the above object of the present invention, there is provided a method for accessing a home-network, in a network access method of a network system in which an open Internet Protocol (IP) address is used for an external network and a private IP address is provided for an internal network resource, the method for accessing the home-network having the steps of (a) collecting user information and an open IP address from the network system; (b) authenticating an authorized user, who wants to access an internal network resource, based on the user information and open IP address collected in the step (a); and (c) providing the open IP address to the user authenticated in the step (b) so that a virtual network between the authenticated user and the internal network resource that the user wants to use is established.

To accomplish another object of the present invention, there is also provided an apparatus for accessing a home-network in a network system having a gateway, which has user information and an open IP address, for mediating internal network resources having private IP addresses and access to the Internet, and a home-portal server for communicating authentication data with a user apparatus using the open IP address received in the gateway, in which the home-portal server has an information storage unit for storing user-related information; an address monitoring unit for collecting user information and open IP addresses from the gateway, then determining whether or not the user information is valid, and storing the open IP address corresponding to the user information in the information storage unit; and an authentication server unit for referring to user information stored in the information storage unit, in response to the authentication request from the user apparatus, and, if the user is authorized, providing the open IP address stored in the information storage unit to the user apparatus.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Hereinafter, embodiments of the present invention will be described in detail with reference to the attached drawings.

The present invention is not restricted to the following embodiments, and many variations are possible within the spirit and scope of the present invention. The embodiments of the present invention are provided in order to more completely explain the present invention to anyone skilled in the art.

Figure 1:
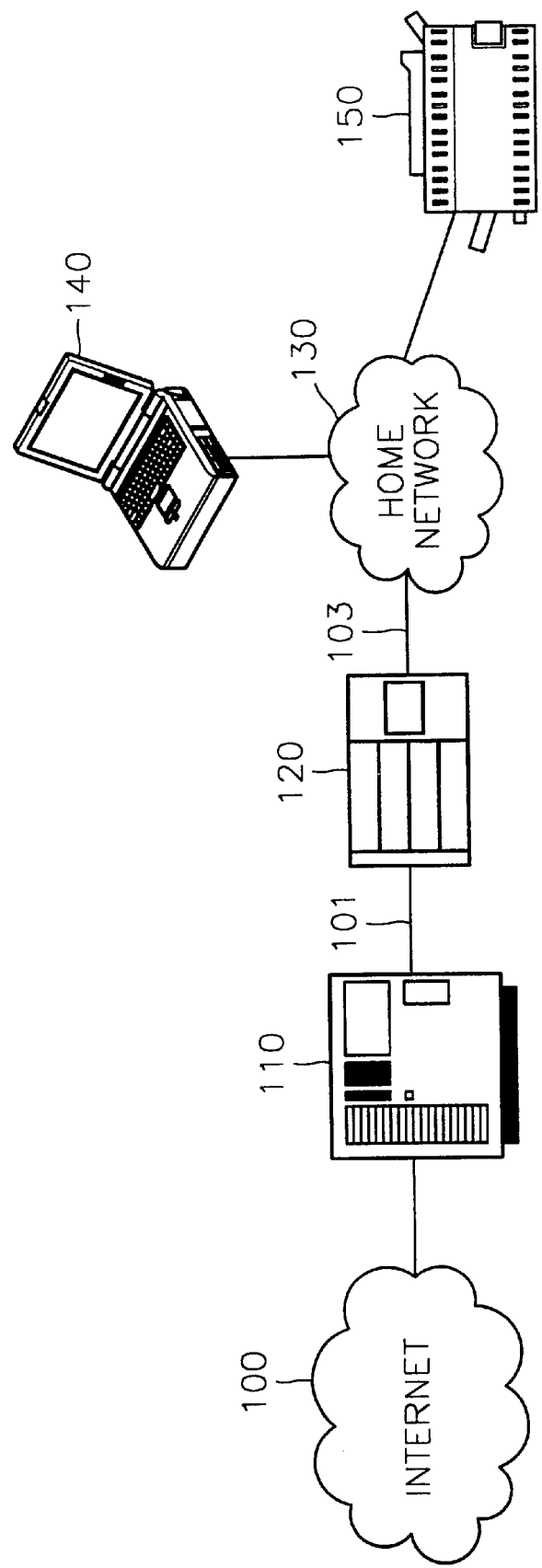
FIG. 1 illustrates the structure of a connection between an ordinary home-network and the Internet.
Figure 2:
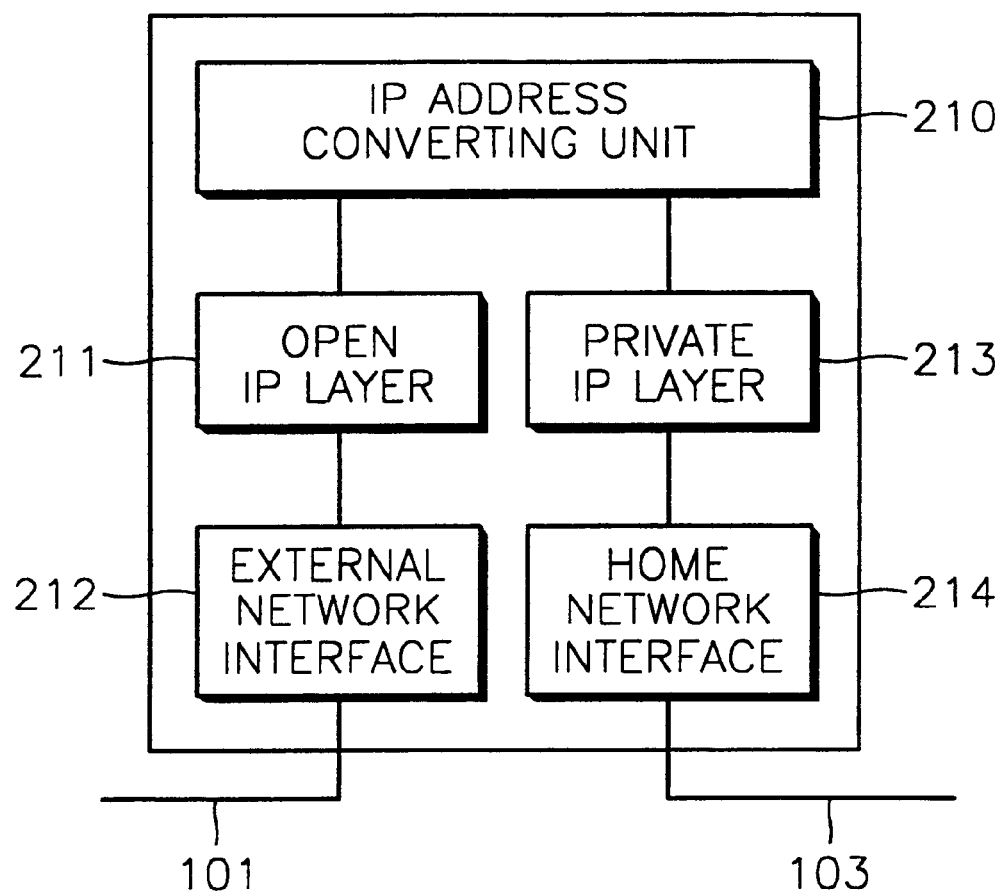
FIG. 2 is a detailed diagram of a lower layer of the home-gateway of FIG. 1.
Figure 3:
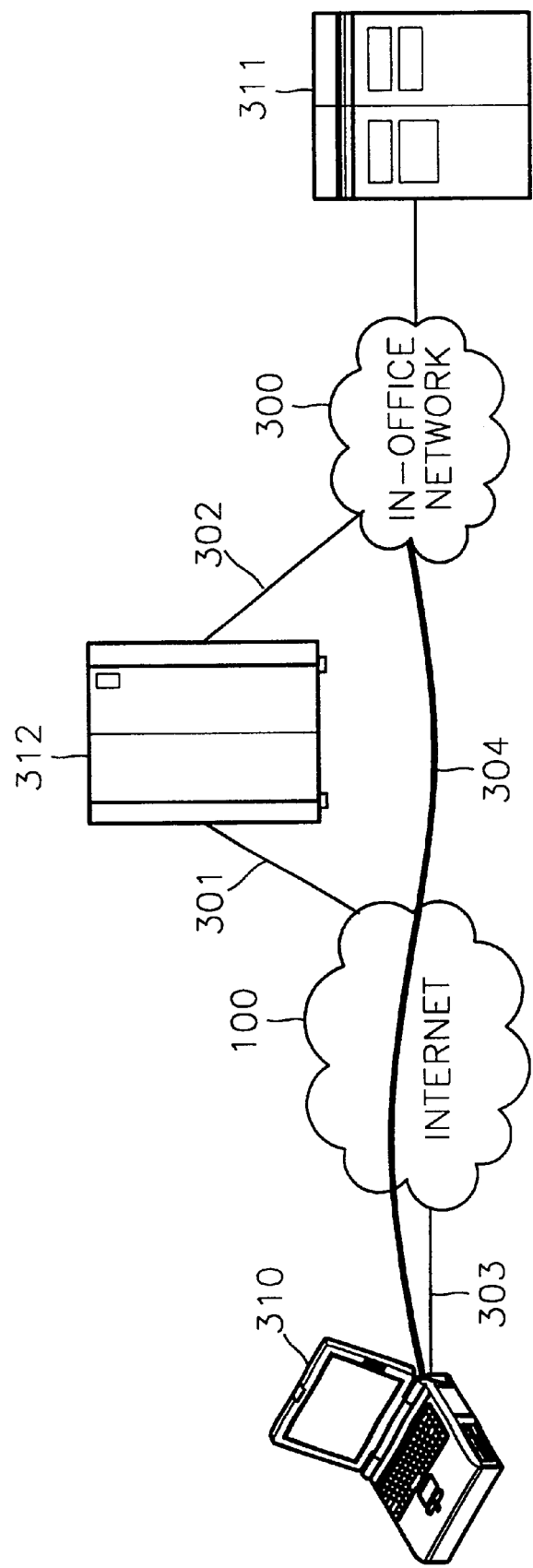
FIG. 3 illustrates the structure of an ordinary virtual private network (VPN)
Figure 4:
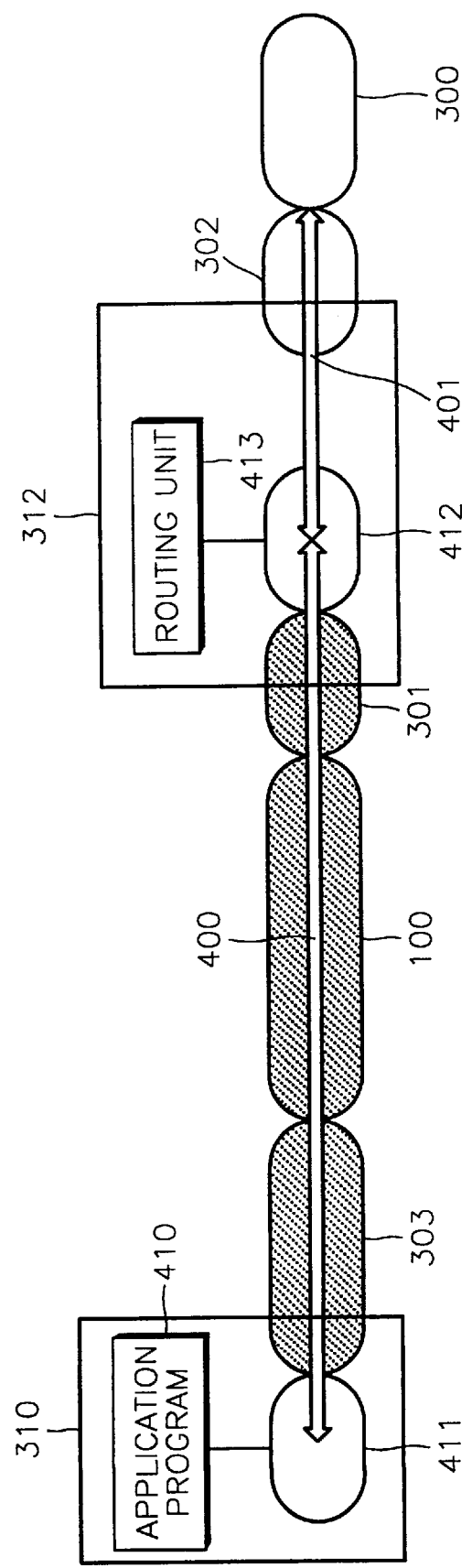
FIG. 4 illustrates the concept of a VPN tunneling of FIG. 3.
Figure 5:
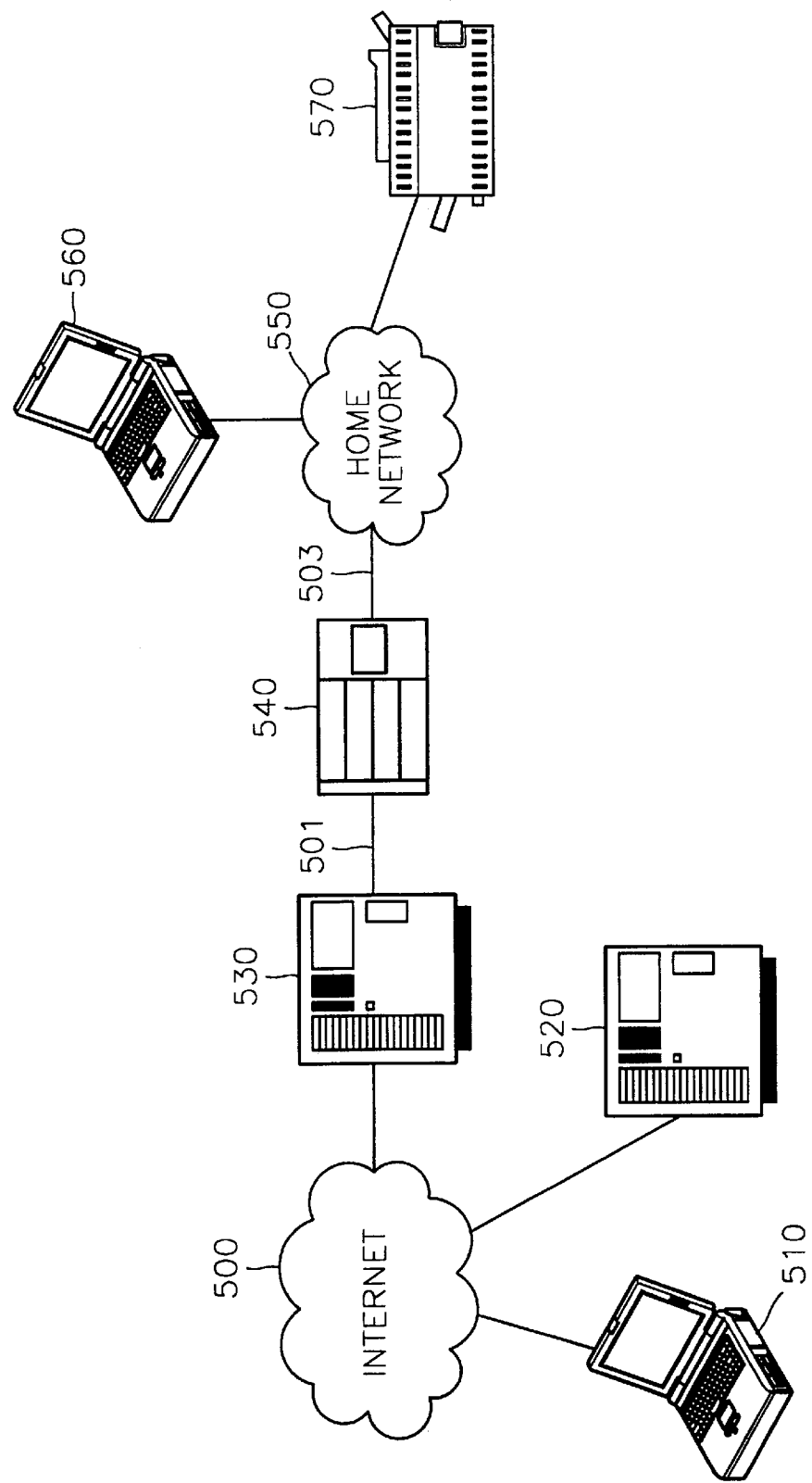
FIG. 5 illustrates the structure of a home-network access system in which a remote apparatus according to the present invention locates a home-gateway, using a home-portal server.

FIG. 5 illustrates the structure of a home-network access system in which a remote apparatus according to the present invention locates a home-gateway, using a home-portal server.

Referring to FIG. 5, a remote apparatus 510 and a home-portal server 520 are linked to the Internet 500. Home-network apparatuses 560 and 570 linked to the home-network 550 are linked to the Internet 500 through a home-gateway 540. The home-gateway 540 has limited open IP addresses and mediates accesses of the home-network apparatuses 560 and 570 and remote apparatuses linked to the Internet 500. An ISP 530 is linked to the home-gateway 540 and the Internet 500 and provides Internet access services to the home-gateway 540.

Figure 6:
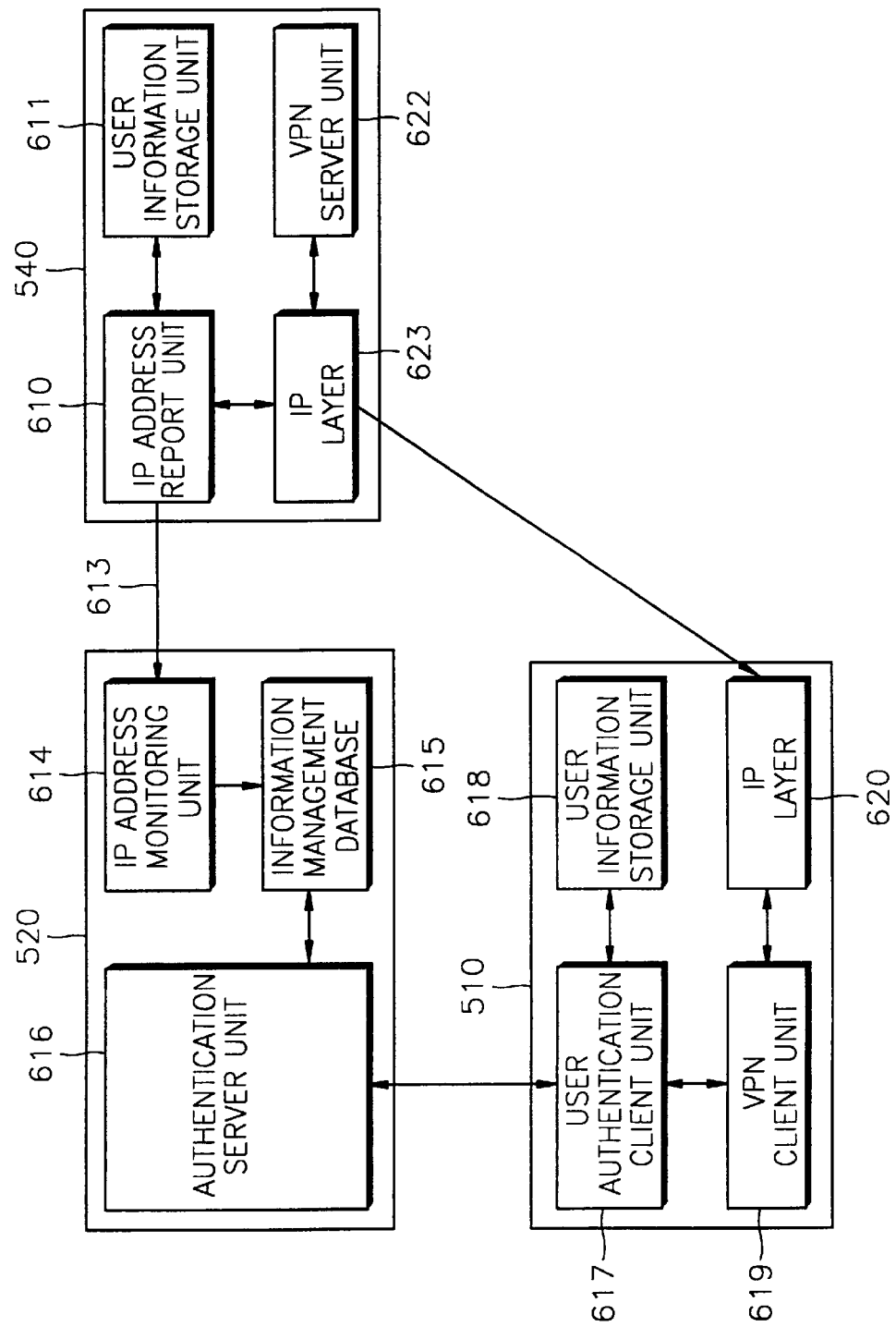
FIG. 6 is a block diagram for showing mutual operations of the home-portal server, the home-gateway, and the remote apparatus in the structure of FIG. 5.

FIG. 6 is a block diagram for showing mutual operations of the home-portal server, the home-gateway, and the remote apparatus in the structure of FIG. 5.

Referring to FIG. 6, the home-gateway 540 includes an IP layer 623 linked to an external interface, a server unit 622 for processing a VPN, a user information storage unit 611 for storing user information, and an IP address report unit 610. The remote apparatus 510 includes a user authentication client unit 617, a VPN client unit 619, a user information storage unit 618, and an IP layer 620. The home-portal server 520 includes an authentication server unit 616, an IP address monitoring unit 614, and an information management database 615, and a separate transmission control protocol/Internet protocol (TCP/IP) stack (not shown). Here, the IP address monitoring unit 614 forms a communication channel, communicates information with the IP address report unit 610 of the home-gateway 540, and stores collected information in the information management database 615. The authentication server unit 616 provides authentication to the user authentication client unit 617 of the remote apparatus 510.

As shown in FIG. 6, the process in which a remote apparatus accesses the home-network can be roughly divided into the following three stages. That is, in the first stage, the IP address report unit 610 of the home-gateway 540 sends information to be reported using the user information and an open IP address to the IP address monitoring unit 614 of the home-portal server 520. Then, in the second stage, the user authentication client unit 617 of the remote apparatus 510 accesses the home-portal server 520, and receives the open IP address of the current home-gateway 540 recorded in the information management database 615. In the third stage, the VPN client unit 619 of the remote apparatus 510 forms a virtual channel through the VPN server unit 622 of the home-gateway 540 and the IP layers 620 and 623, and accesses the home-network 550. Then, the home-gateway 540 interprets the received packet and sends the data to home-network apparatuses 560 and 570 corresponding to the private IP address recorded in the destination field.

FIGS. 7 through 10 are flowcharts for showing controls of the home-gateway, the home-portal server, and the remote apparatus, in order for an external remote apparatus to access a home-network.

Figure 7:
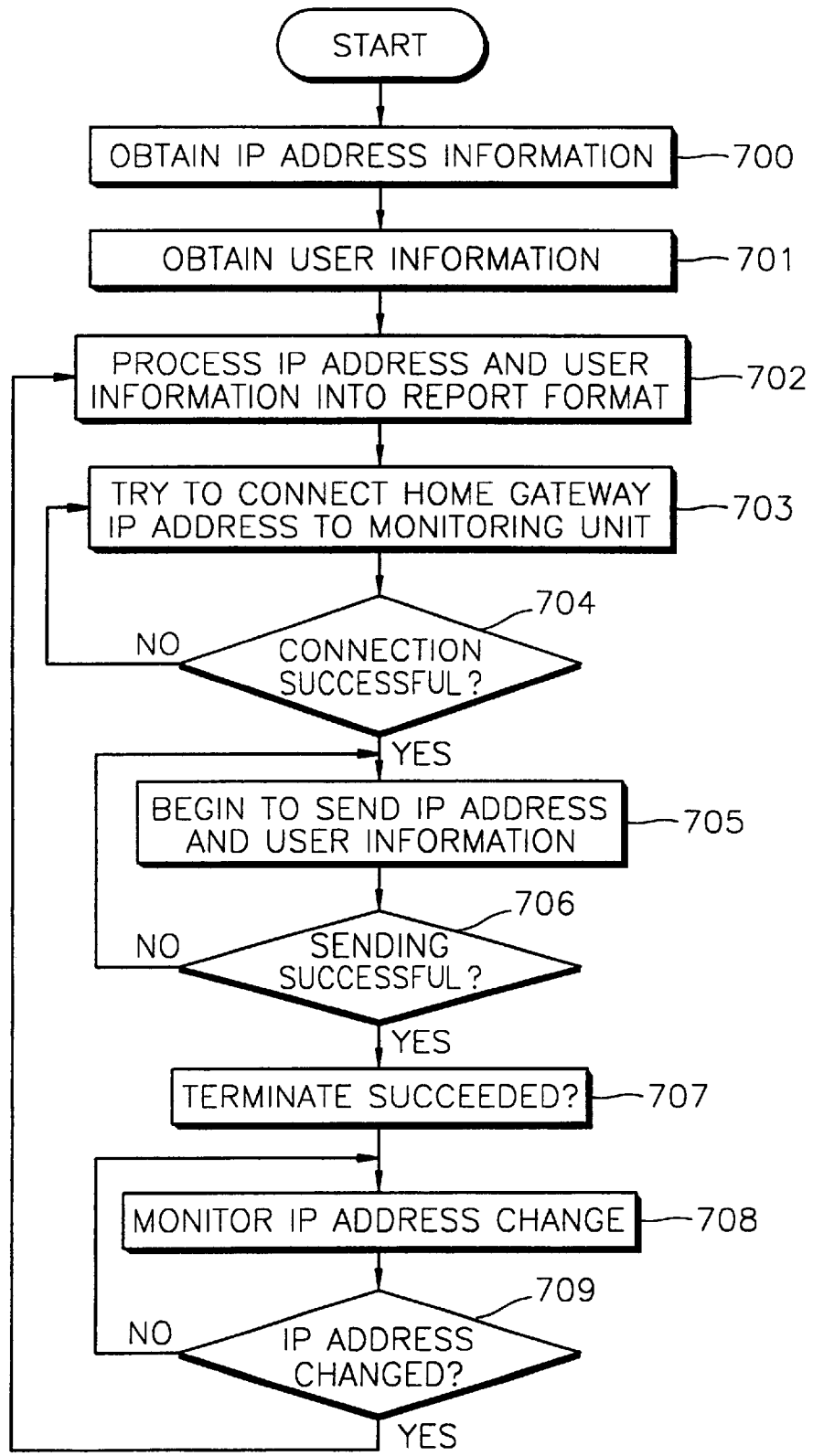
FIGS. 7 through 10 are flowcharts for showing controls of the home-gateway, the home-portal server, and the remote apparatus, in order for an external remote apparatus to access a home-network.

First, FIG. 7 is a flowchart for showing the internal control of the IP address report unit 610 in the home-gateway 540.

Referring to FIG. 7, the IP address report unit 610 receives an open IP address provided from the ISP 530 and stored in the IP layer 623 in step 700, and reads user information stored in the user information storage unit 611 in step 701. Then, the open IP address read from the IP layer 623 and the user information read from the user information storage unit 611 are processed into a report format in step 702. The IP address report unit 610 tries to form a network channel 613 to the IP address monitoring unit 614 of the home-portal server 520 in step 703. At this time, if the connection to the network channel is successful in step 704, the open IP address to be reported and user information are sent in step 705, and if the connection is not successful, the IP address report unit 610 continues to try to form a network channel 613 in step 703. Then, if sending information is successful, the connection is terminated in step 707, and then, whether or not the open IP address of the IP layer 623 changes is monitored in step 709. If the address of the IP layer 623 changes, the IP address and user information are processed and then again reported.

Figure 8:
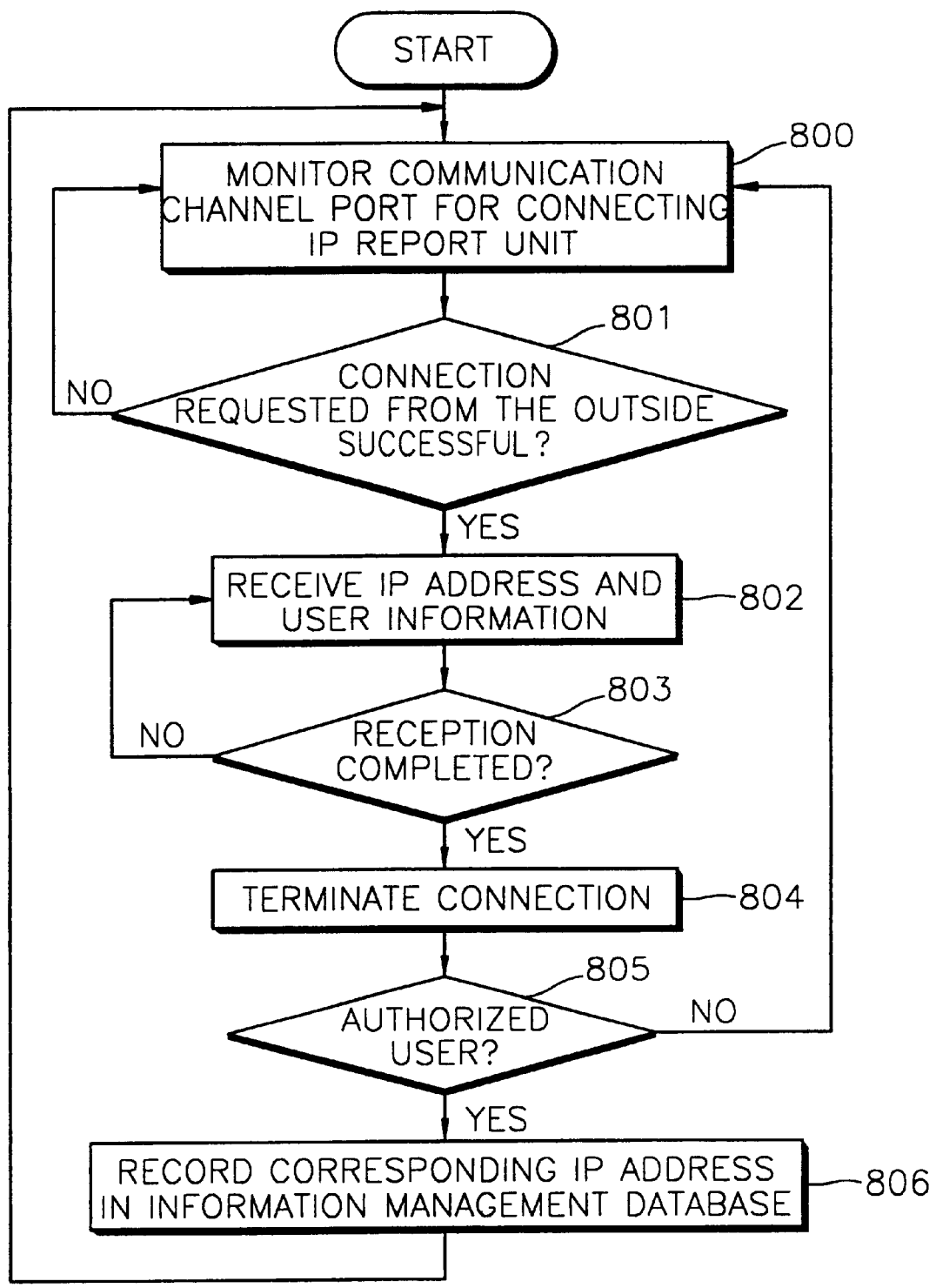

FIG. 8 is a flowchart for showing the internal controls of the IP address monitoring unit 614 of the home-portal server 520.

Referring to FIG. 8, the IP address monitoring unit 614 monitors a communication channel port for connection of the IP address report unit 610 of the home-gateway 540 in step 800. Then, if a connection request from the IP address report unit 610 is received in step 801, the IP address monitoring unit receives the open ID address and user information provided from the IP address report unit 610 of the home-gateway 540 through the communication channel port in step 802. If the reception is completed in step 803, the network channel connection is terminated in step 804 and user information is checked in step 805. At this time, if it is determined that the user is an authorized user, the received open IP information is recorded in the information management database 615 in step 806 and the IP address monitoring unit 614 waits for a next connection request. Meanwhile, if the user is not authorized, the received information is neglected and the IP address monitoring unit 614 continues to monitor the communication channel port in step 800.

Figure 9:
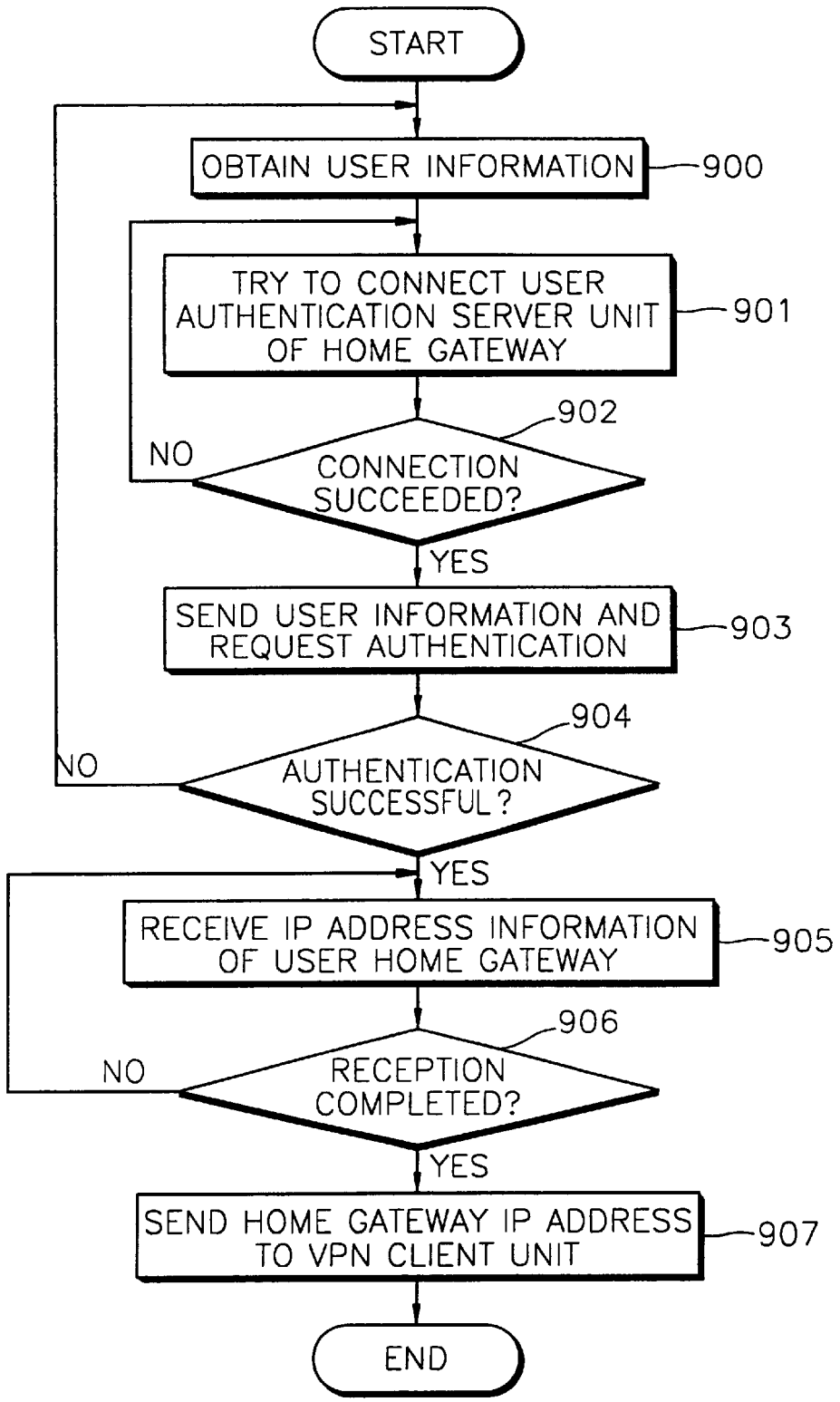

FIG. 9 is a flowchart for showing the internal controls of the user authentication client unit 617 of the remote apparatus 510.

Referring to FIG. 9, the user authentication client unit 617 reads user information from the user information storage unit 618 in step 900, and tries to connect the authentication server unit 616 of the home-portal server 520 using the user information in step 901. At this time, if the connection is successful and a communication channel is formed in step 902, user information is sent to the authentication server unit 616 of the home-portal server 520 and an authentication is requested in step 903. At this time, if the authentication is successful in step 904, information on the open IP address of the user home-gateway is received in step 905, and if the reception is completed in step 906, the open IP address of the home-gateway 540 is sent to the VPN client unit 619 in step 907.

Figure 10:
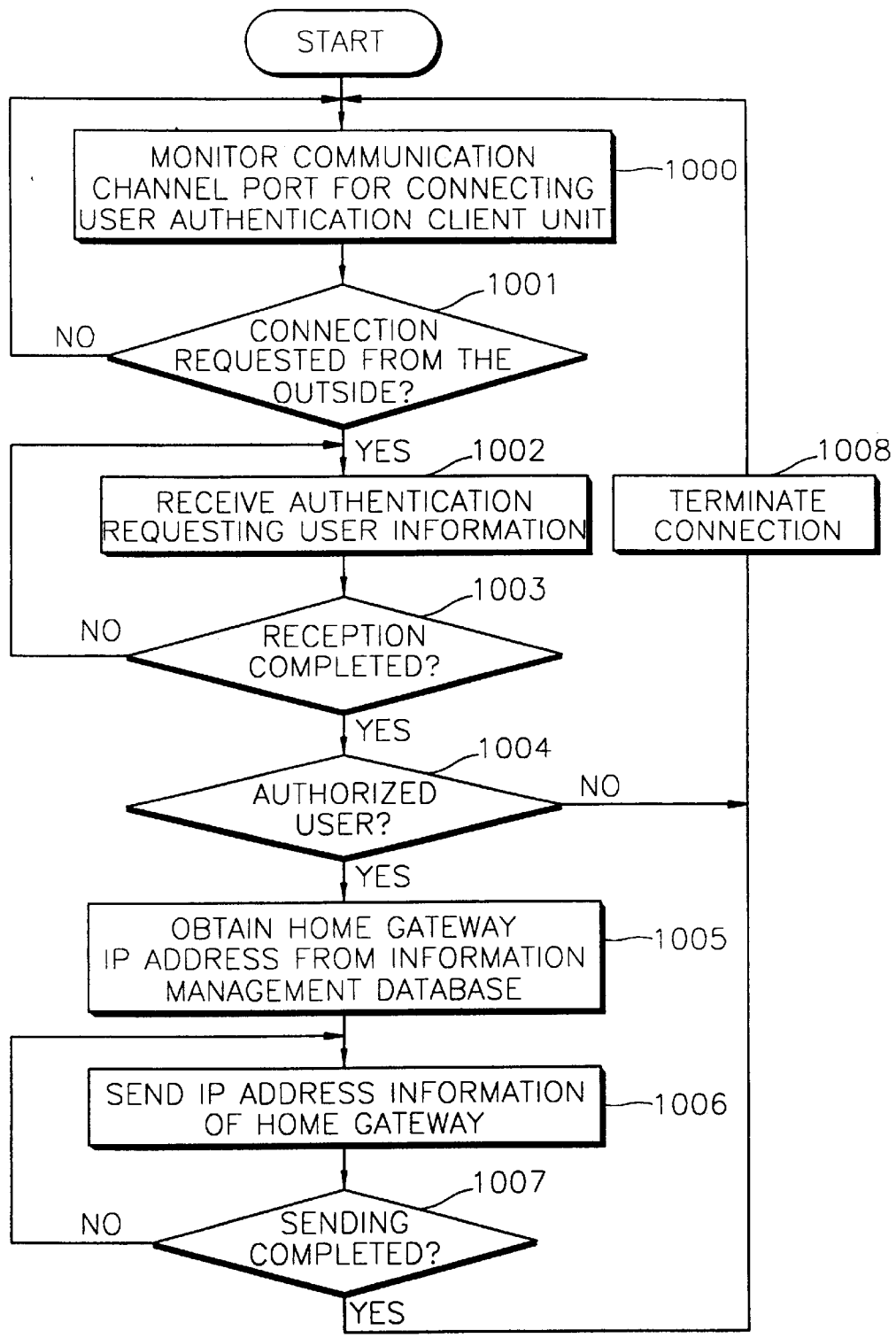

FIG. 10 is a flowchart for showing the internal controls of the authentication server unit 616 of the home-portal server 520.

Referring to FIG. 10, the authentication server unit 616 of the home-portal server 520 monitors the communication channel port for connecting the user authentication client unit 617 of the remote apparatus 510 in step 1000. If a request for connection of the network channel from the remote apparatus 510 is received in step 1001, a channel is formed and user information of the user who requested authentication is received in step 1002. If the reception is completed in step 1003, user information is compared to information in the information management database 615 to check whether or not the user is authorized in step 1004. At this time, if the user is authorized, the IP address of the home-gateway recorded in the information management database 615 is read in step 1005, and sent to the user authentication client unit 617 of the remote apparatus 510 in step 1006. Then, if the sending is completed in step 1007, the connection is terminated and the original monitoring mode is repeated in step 1000.

The present invention may be embodied in program code, which can be read by a computer, on a computer readable recording medium. The computer readable recording medium may be any kind on which computer readable data is stored. The computer readable recording media may be storage media such as magnetic storage media (e.g., ROM's, floppy disks, hard disks, etc.), optically readable media (e.g., CD-ROMs, DVDs, etc.), or carrier waves (e.g., transmissions over the Internet). Also, the computer readable recording media can be scattered on computer systems connected through a network and can store and execute a computer readable code in a distributed mode.

What is claimed is:

1. A method for accessing a home-network, in a network system wherein an open Internet Protocol (IP) address is used for an external network and a private IP address is provided for an internal network resource, the method for accessing the home-network comprising the steps of:

(a) collecting user information and an open IP address from the network system;

(b) authenticating an authorized user, based on the user information and open IP address collected in the step (a); and (c) providing the open IP address to the user authenticated in the step (b) so that a virtual network between the authenticated user and an internal network resource is established.

2. The method of claim 1, wherein the authorized user wants to access the internal network resource.

3. The method of claim 1, wherein if it is determined that the user is authorized in the step (b), a step for updating the collected open IP address in a recording medium is further included.

4. The method of claim 1, wherein if the user is not authorized, a step for neglecting the collected user information and the open IP address and waiting for a connection request is further included.

5. The method of claim 2, wherein if the user is not authorized, a step for neglecting the collected user information and the open IP address and waiting for a connection request is further included.

6. The method of claim 4, wherein the open IP address collected in the step (a) indicates that the user is not authorized.

7. The method of claim 5, wherein the open IP address collected in the step (a) indicates that the user is not authorized.

8. The method of claim 1, wherein the open IP address is collected in a form of a report from an IP layer of a gateway of the network system.

9. The method of claim 2, wherein the open IP address is collected in a form of a report from an IP layer of a gateway of the network system.

10. A user apparatus for accessing a home-network in a network system having a gateway for mediating internal network resources having private IP addresses and access to the Internet, said gateway having user information and an open IP address, and a home-portal server for communicating authentication data with the user apparatus using the open IP address received in the gateway, wherein the home-portal server comprises:

an information storage unit for storing user-related information;

an address monitoring unit for collecting user information and open IP addresses from the gateway, then determining whether or not the user information is valid, and storing the open IP address corresponding to the user information in the information storage unit; and an authentication server unit for referring to user information stored in the information storage unit, in response to an authentication request from the user apparatus, and, if the user is authorized, providing the open IP address stored in the information storage unit to the user apparatus.

11. The user apparatus of claim 10, wherein the home-portal server has a separate transmission control protocol/Internet protocol (TCP/IP) stack.

12. The user apparatus of claim 10, wherein the gateway further comprises a virtual private network server to build a virtual network between the user apparatus and the gateway.

13. A network system having a gateway for mediating internal network resources having private IP addresses and access to the Internet, a user apparatus for accessing a home-network, and a home-portal server for communicating authentication data with the user apparatus, wherein said gateway has user information and an open IP address, and the home-portal server comprises:

an information storage unit for storing user-related information;

an address monitoring unit for collecting user information and open IP addresses from the gateway, then determining whether or not the user information is valid, and storing the open IP address corresponding to the user information in the information storage unit; and an authentication server unit for referring to user information stored in the information storage unit, in response to an authentication request from the user apparatus, and, if the user is authorized, providing the open IP address stored in the information storage unit to the user apparatus.

14. The network system of claim 13, wherein the home-portal server has a separate transmission control protocol/Internet protocol (TCP/IP) stack.

15. The network system of claim 13, wherein the gateway further comprises a virtual private network server to establish a virtual network between the user apparatus and the gateway.

16. A home-portal server for communicating authentication data with a user apparatus in a network system having a gateway for mediating internal network resources having private IP addresses and access to the Internet, and said user apparatus for accessing a home-network, wherein said gateway has user information and an open IP address, and the home-portal server comprises:

an information storage unit for storing user-related information;

an address monitoring unit for collecting user information and open IP addresses from the gateway, then determining whether or not the user information is valid, and storing the open IP address corresponding to the user information in the information storage unit; and an authentication server unit for referring to user information stored in the information storage unit, in response to an authentication request from the user apparatus, and, if the user is authorized, providing the open IP address stored in the information storage unit to the user apparatus.

17. The network system of claim 16, wherein the home-portal server has a separate transmission control protocol/Internet protocol (TCP/IP) stack.

18. The network system of claim 16, wherein the gateway further comprises a virtual private network server to establish a virtual network between the user apparatus and the gateway.

19. A gateway in a network system having a user apparatus for accessing a home-network, and a home-portal server for communicating authentication data with the user apparatus, wherein said gateway has user information and an open IP address, and the home-portal server comprises:

an information storage unit for storing user-related information;

an address monitoring unit for collecting user information and open IP addresses from the gateway, then determining whether or not the user information is valid, and storing the open IP address corresponding to the user information in the information storage unit; and an authentication server unit for referring to user information stored in the information storage unit, in response to an authentication request from the user apparatus, and, if the user is authorized, providing the open IP address stored in the information storage unit to the user apparatus.

20. The gateway of claim 19, wherein the home-portal server has a separate transmission control protocol/Internet protocol (TCP/IP) stack.

21. The gateway of claim 19, further comprising a virtual private network server to establish a virtual network between the user apparatus and the gateway.

\* \* \* \* \*